Figure 1:
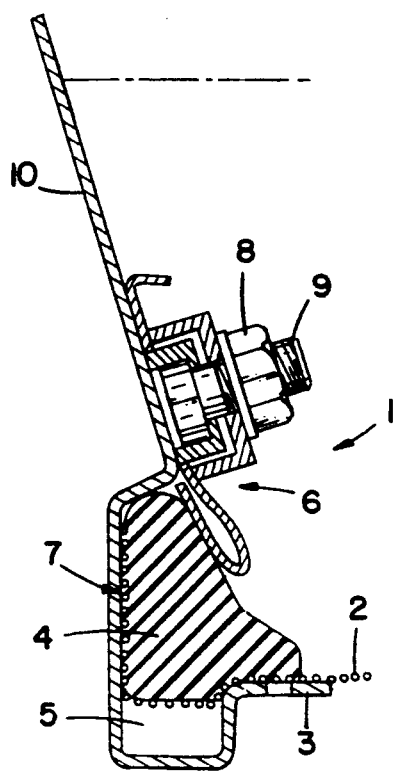

United States Patent [19]

Barloy

[11] Patent Number: 5,124,037
[45] Date of Patent: Jun. 23, 1992

[54] DEVICE FOR FILTRATION OF SOLID ELEMENT CONTAINED WITHIN A LIQUID

[75] Inventor: Michel Barloy, Bois d'Arcy, France
[73] Assignee: Krebs, Bois d'Arcy, France
[21] Appl. No.: 669,951
[22] Filed: Mar. 15, 1991

[30] Foreign Application Priority Data
Feb. 28, 1991 [FR] France ................ 91 02427

[51] Int. Cl.$^5$ ............................................. B01D 33/19
[52] U.S. Cl. .................................... 210/328; 210/450
[58] Field of Search ................... 210/328, 450, 331

[56] References Cited
U.S. PATENT DOCUMENTS

| | | | |
|---|---|---|---|
| 3,216,576 | 11/1965 | Roos | 210/328 |
| 3,648,926 | 3/1972 | Pause | 494/60 X |
| 4,277,338 | 7/1981 | Hoagland | 210/450 X |

FOREIGN PATENT DOCUMENTS 238157  1/1964  Netherlands ............ 210/328

OTHER PUBLICATIONS

J. G. Kronseder et al., in *Phosphoric Acid*, Editor A. V. Slack, pp. 461-472, 1968.

Primary Examiner—Frank Spear
Attorney, Agent, or Firm—Merchant, Gould, Smith, Edell, Welter & Schmidt

[57] ABSTRACT

The invention relates to a device for filtering on a substantially horizontal plane, comprising a filter cloth (50) and a structure (51) for supporting the filter cloth capable of tilting about a horizontal axis (47) and comprising a peripheral groove (48) of uniform cross-section. The cloth is fastened to the support by a hollow tubular gasket (55) made of elastic or substantially elastic material, arranged to interact with the groove; the tubular gasket is designed to distort transversely between a free or contracted state in which it can be easily introduced into the groove into which the filter cloth has been inserted beforehand, and a distorted or dilated state in which it locks the cloth inside the groove by pressure.

12 Claims, 3 Drawing Sheets

DEVICE FOR FILTRATION OF SOLID ELEMENT CONTAINED WITHIN A LIQUID

The present invention relates to devices for filtering out solid components contained in a liquid, on a horizontal or substantially horizontal filter plane, of the type comprising a filter cloth, a structure for supporting the filter cloth capable of tilting about a horizontal axis and means for fastening the cloth to the supporting structure.

It finds a particularly important, although not exclusive, application in the field of filtration of phosphoric acid in the case of the manufacture of phosphoric acid by a wet route.

Filtering devices of the type defined above are already known.

Figure 2:
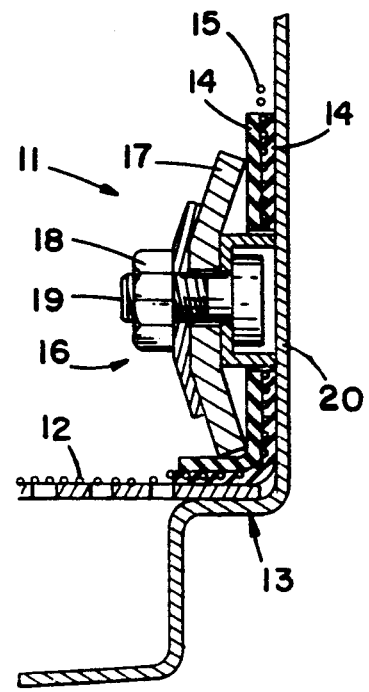

These devices have means for fastening the cloth to the structure which generally depend on two designs which have been shown in FIGS. 1 and 2.

FIG. 1 shows means 1 for fastening the cloth 2 to the structure 3.

They comprise a solid lengthwise part 4, made, for example, of elastomeric material, arranged so as to compress the cloth 2 in a groove 5 made on the periphery of the structure, projecting outwards from the structure.

A fastening member 6 applies pressure and compresses the edge 7 of the cloth and the solid part 4 in the groove.

The member 6 is fastened by nuts 8 screwed onto screws 9 distributed at uniform intervals on, and integrally attached to, the peripheral wall 10 of the structure 3.

These fastening means 1 have disadvantages

They are in particular bulky, and this reduces the surface area and the volume available for filtration above the cloth, and are, in addition, long and tedious to fit and/or remove.

FIG. 2 shows another embodiment of known means 11 for fastening a cloth 12 to a structure 13. They comprise two parts 14 made of elastic material of small thicknesses between which the edge 15 of the cloth is kept sandwiched.

The parts 14 and the edge 15 of the cloth are fastened by a fastening member 16 comprising a blade 17 for compressing the parts 14 on the peripheral wall 20 of the structure 13. To do this, nuts 18, screwed onto screws 19 integrally attached to the peripheral wall 20 compress the parts 14 and the cloth 12 between the blade 17 and the wall 20.

Here, again, these fastening members 11 have disadvantages which are comparable to those above, namely: they are bulky and difficult to fit and undo; in addition, they require the filter cloth to be pierced.

The present invention is aimed at providing a device for filtering solid components contained in a liquid responding to practical requirements better than those known previously, especially in that it makes it possible to increase the effective filter area and the available volume, at the same external bulk of the structure, and in that it makes it easier to fit and remove the cloth, while reducing its dimensions and hence its cost.

To this end, the invention proposes a device for filtering out solid components contained in a liquid, on a horizontal or substantially horizontal filter plane of the type defined above, characterized in that the supporting structure comprises a groove of uniform cross-section, situated in the horizontal filter plane and extending over at least a part of the peripheral region of said structure, and in that the fastening means comprise at least one hollow tubular gasket made of elastic or substantially elastic material, arranged to interact with said groove, said tubular gasket being designed to distort transversely between a free or contracted state, in which it can be easily introduced into the groove into which the filter cloth has been inserted beforehand, and a distorted or dilated state, in which it locks the cloth inside said groove by pressure.

A free state is intended to mean the state of the tubular gasket at rest, without internal or external tensile or compressive stressing of the tubular gasket.

The "easy" introduction or extraction of the tubular gasket in the free or contracted state means that these operations can be carried out manually or with the aid of simple tools, by applying a small compressive or tensile force to the tubular gasket, in order to introduce it into or extract it from the groove, that is to say for example lower than of the order of 100 to 150 Newtons.

In advantageous embodiments one/or other of the following arrangements are additionally adopted:

- the groove extends over the whole or substantially the whole of the length of the peripheral region of said structure, situated in the horizontal filter plane;
- the section of the groove is of dovetail shape;
- the bottom of the dovetail-shaped groove is concave [sic] or rounded;
- the tubular gasket has an oval or circular cross-section in the free state;
- the tubular gasket is arranged to dilate under the effect of a fluid under pressure injected into said tubular gasket;
- removable means for inflating the tubular gasket with the fluid under pressure are provided;
- the fluid is water at a pressure of between approximately 1 bar and approximately 5 bars;
- the tubular gasket is provided with a valve or a small filling and pressurizing valve, and the groove is provided with a chamber whose cross-section is larger than that of said groove, arranged to receive said valve.

Figure 5:
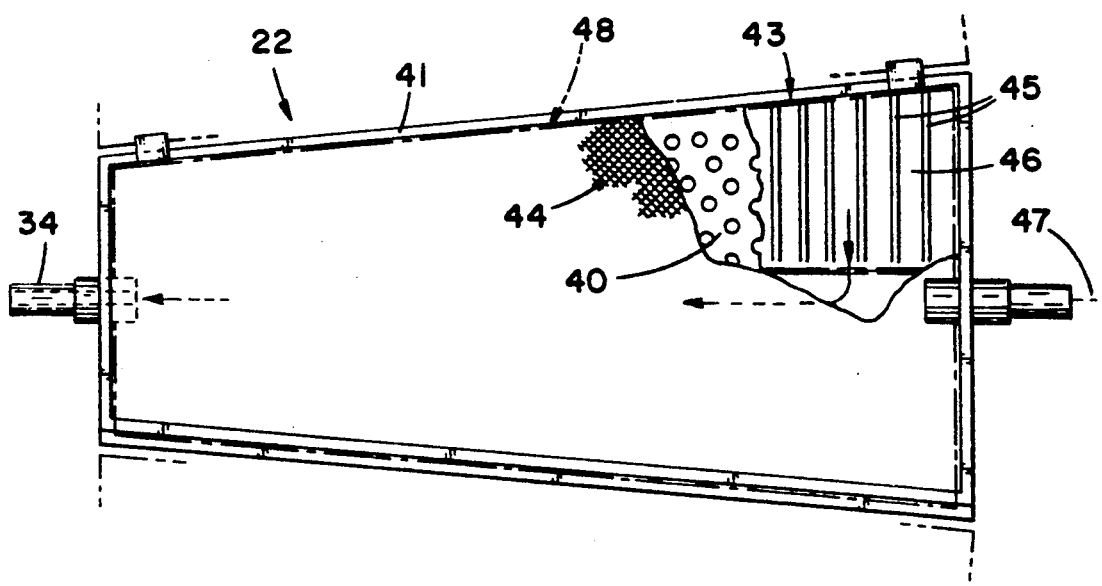
Figure 3:
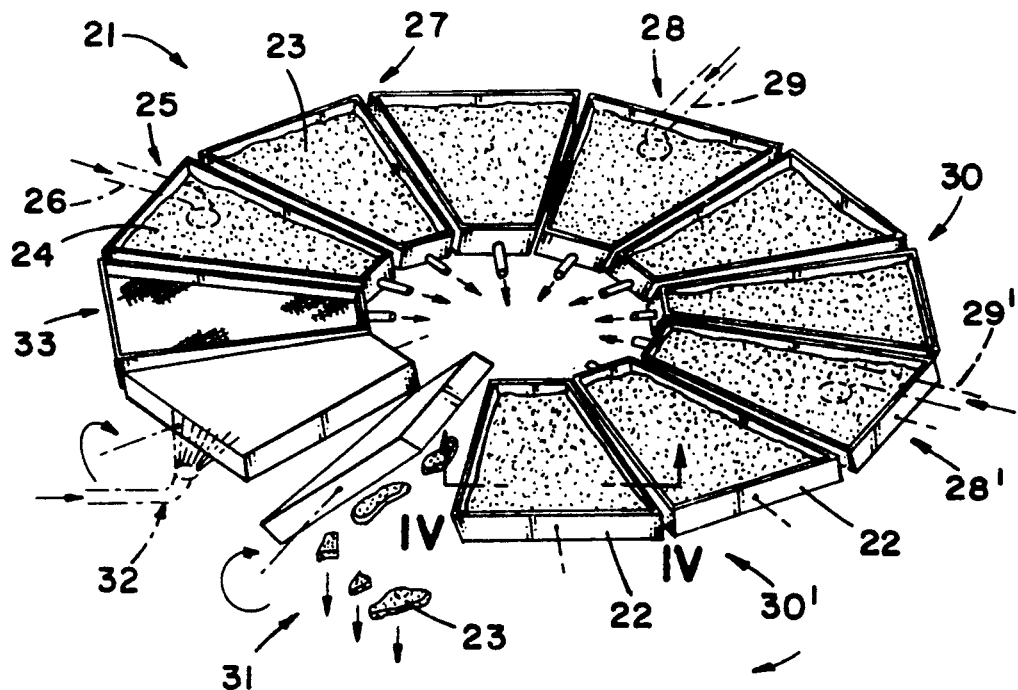
Figure 4:
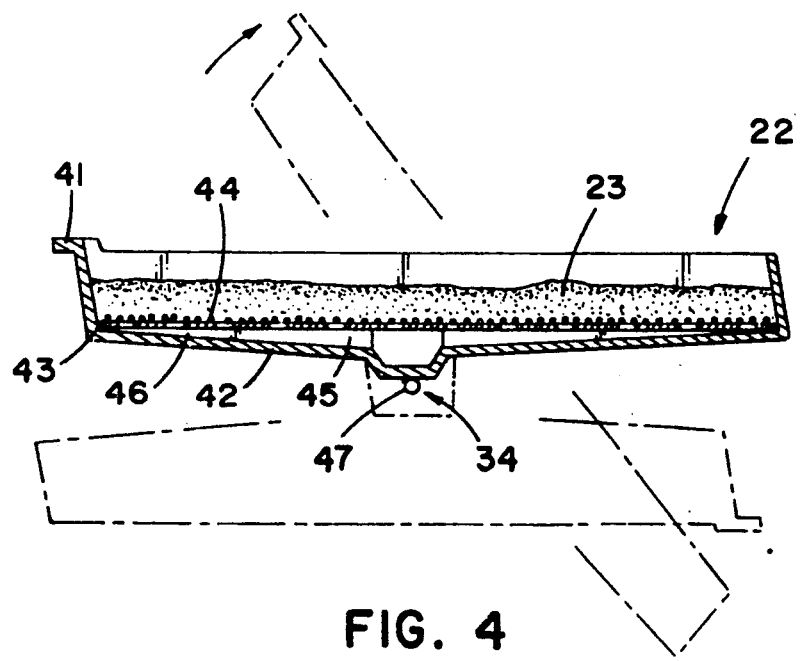
Figure 6:
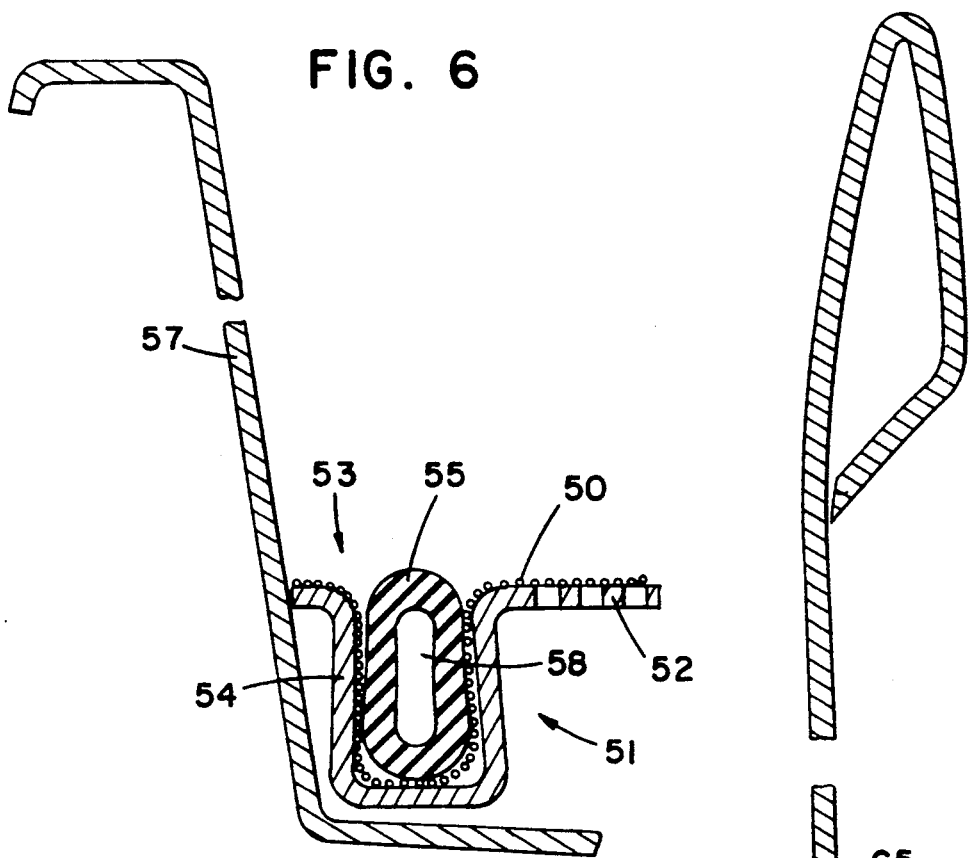
Figure 7:
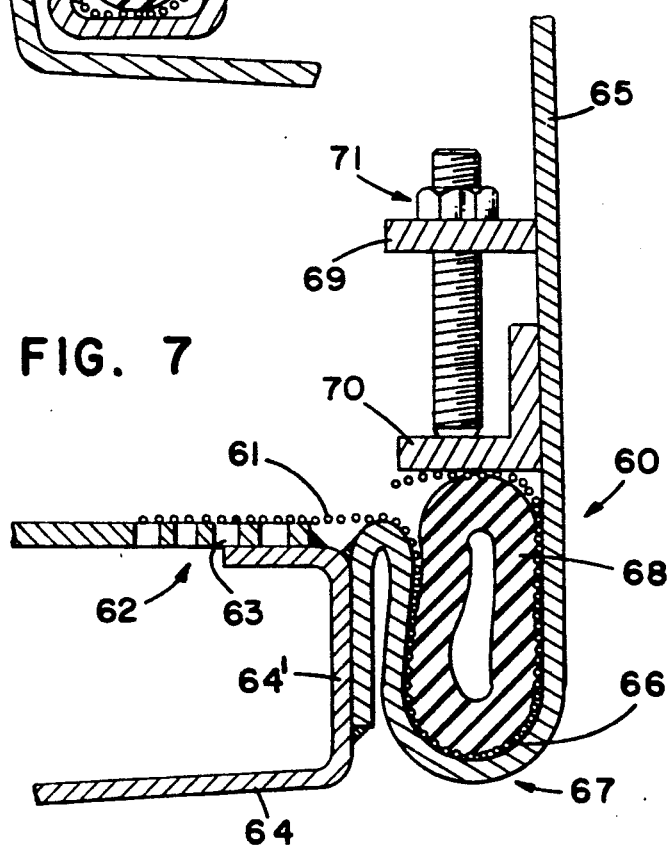

The invention will be understood better on reading the description which follows, of a particular embodiment given by way of example without any limitation being implied. The description refers to the drawings which accompany it and which contain, in addition to the FIGS. 1 and 2, already described:

FIG. 3, showing diagrammatically, in perspective, filtering devices according to the embodiment of the invention described more particularly here and employed in an apparatus which is known per se, for filtering phosphoric acid;

FIG. 4, showing a view in section along IV—IV, of a device of FIG. 3 and of the positions which it may adopt in pivoting about a horizontal axis;

FIG. 5, giving a top view of the device of FIG. 4;

FIG. 6 showing, in cross-section, a first embodiment of the means for fastening the filter cloth, according to the invention;

FIG. 7 showing, in cross-section, a second embodiment of the means for fastening the filter cloth, according to the invention.

FIG. 3 is a diagrammatic view in perspective of a circular filtration apparatus 21 comprising devices 22 for filtering out the solid components 23 contained in a liquid or a slurry 24, according to the embodiment of the invention more particularly described here, applied to the manufacture of phosphoric acid by a wet route.

The devices 22 are brought cyclically and successively into a first position 25, for feeding slurry, for example via a pipe 26, a second position 27 for dewatering, and then two positions for washing 28, 28' by spraying water at 29, 29', followed by two dewatering stages 30, 30' respectively. Each device is then emptied at 31 by tilting the device 22 about a horizontal axis, and is then cleaned at 32 before draining off at 33.

The drainage of the filtered liquid takes place toward the center of the apparatus via collectors 34, the cake consisting of the solid components separated off 23 remaining in the devices until they are emptied at 31.

A filtering device 22 of the apparatus 21 has been shown more precisely in FIGS. 4 and 5.

The device 22, known as a bucket in technical parlance, comprises essentially a body 41 forming a cell with a cross-section substantially in the shape of a parallelogram, open at the top, and with a surface in the shape of a circular sector portion (see FIG. 5) and a horizontal metal sheet 40, pierced with uniformly spaced holes, supporting the filter cloth.

The bottom 42 of the bucket has a double slope, firstly towards the radial axis and secondly towards the central part of the apparatus 21, so as to collect the filtration liquors and to remove them, as already seen, towards the collectors 34.

The device comprises means 43 for supporting a filter cloth 44 which are attached, for example, by welding to the bottom 42 by means of transverse metal ribs 45. Spaces 46 for draining the filtrates are arranged between the lower face of the supporting means and the bottom of the body 41. These supporting means are, for example, a metal grid or advantageously, in the embodiment described more particularly here, a perforated metal sheet, for example from 4 to 6 mm in thickness with oblong holes of 35 mm×6 mm and a perforation ratio of 5 to 45%.

The bucket 22 is arranged in a manner known per se, so as to tilt about a horizontal axis 47 situated below the bucket, as shown by a dot-and-dash line in FIG. 4.

FIG. 5 shows the bucket of FIG. 4 in top view, partially exploded. The filter cloth 44 is fastened over the whole periphery 48 of the perforated metal sheet 43, as will be seen later.

In the case described more particularly here, of the application to the filtration of phosphoric acid, the cloth is, for example, woven in monofilament polypropylene threads and has a thickness of the order of 0.5 mm. Since the size of the gypsum crystals is generally between 10 and 100 microns, the porosity of the cloth is, furthermore, suitably designed.

Two embodiments of fastening of the cloth according to the invention will now be described with reference to FIGS. 6 and 7.

FIG. 6 shows, in section, a first method of fastening a cloth 50 to a supporting structure 51 consisting of supports (not shown in the figure) and a grid 52 fastened to said supports. It should be noted that it is the side opposite to the direction of tilting, comprising the end of the bottom 56 of the bucket and the side wall 57, which has been shown more particularly in FIG. 6.

The bucket, of which the cloth support structure forms a part, comprises over its whole peripheral region 53 a groove or flute 54 of uniform cross-section of dovetail shape.

The actual fastening means comprise an inflatable hollow tubular gasket 55 made, for example, of natural rubber or noeprene [sic].

By way of example, no limitation being implied, the tubular gasket is cylindrical, of 16 mm/5 mm external-/internal diameter in the case of a dovetail-shaped groove of size a=15 mm and b=18 mm, with a: minimum transverse distance between wall at the constriction throat of the dovetail, and b: maximum transverse distance between walls substantially level with the bottom of the dovetail.

FIG. 7 shows another embodiment of the means 60 for fastening the cloth 61 to a structure 62 for supporting said cloth. This time it is the side of the bucket situated in the direction of the tilting which has been shown more particularly.

The supporting structure 62 consists in this case of a perforated metal sheet 63 welded to the inwardly bent periphery 64' of the bottom 64 of the bucket body. The side wall 65 of the bucket comprises a groove 66 in its lower part of uniform cross-section, in the shape of a dovetail with a rounded base 67. The groove is, for example, obtained by folding the lower edge of the wall 65, consisting of a metal sheet, towards the inside of the bucket. The upper part of the groove is arranged so that it is situated in the horizontal filter plane.

The fastening means additionally comprise a hollow tubular gasket 68, for example cylindrical, not inflatable, made of neoprene, with external/internal diameters of 18 mm/6 mm in the case of a dovetail-sectioned groove of dimensions a=15 mm, b=17 mm and h=18 mm, where h is the height of the groove.

Means consisting, for example, of continuous angles 70, pushed against the tubular gasket by bolts 71 bearing on the lugs 69 at a distance from each other and fastened to the wall 65 at uniform distances, in a manner known per se, for example by welding, are provided to keep the tubular gasket 68 compressed inside the groove and thus to lock the cloth 61 around the tubular gasket.

Tubular gaskets of other types can be employed, for example with profiles of non-circular section, inflatable or otherwise.

The use of the means for fastening the cloth in the bucket or device according to the invention will now be described with reference to FIG. 6.

The filter cloth, prepared to the right size beforehand, is deposited on the grid and is introduced into the groove 54 arranged at the periphery of the bucket.

The tubular gasket 55, which may be in a number of pieces or a single length, is then introduced manually over the whole periphery of the perforated metal sheet.

Once the tubular gasket is in place, it is inflated using means which are, for example, removable, and are known per se, by injecting water under pressure, for example of 3 bars gauge, into the interior 58 of the tubular gasket, and said tubular gasket is kept at said internal pressure by stopping the pressure feed and isolating the interior of the tubular gasket in a known manner.

The cloth is then fastened rigidly and irremovably, including during the stage of upending and emptying 31 of the bucket, described above with reference to FIG. 1.

The tubular gasket is advantageously inflated by means of a valve fastened to one of its ends, the other end of the tubular gasket being closed by a plug. The peripheral groove or flute can then be provided with a chamber whose cross-section is larger than that of the groove and is arranged to receive the whole of said valve.

The dismantling is carried out easily by decompressing the interior of the tubular gasket, which can then be easily removed from the groove and can release the filter cloth.

When a tubular gasket is employed which is non-inflatable but can be easily compressed (see FIG. 7), it is arranged so as to extend beyond and above the horizontal filter surface consisting of the cloth, in the working position. The tubular gasket is then held in place as already seen, for example using easily demountable angles.

In this latter case the fitting and removal of the cloth may turn out to be slightly longer than in the case of FIG. 6; nevertheless, such an arrangement still offers one of the main advantages of the invention, which is that it increases by up to 8% the filter working area when compared with the prior art, for the same external bulk of the buckets.

As is obvious and as, furthermore, follows from the above, the present invention is not limited to the embodiments described more particularly, but, on the contrary, includes all the alternative forms and especially those where the section of the groove or slot is not dovetail-shaped, but has straight vertical walls or else those where the device is not a bucket of trapezoidal section for a phosphoric acid filter, but a filter intended for other uses.

I claim:

1. A circular horizontal filtering apparatus; said apparatus comprising a plurality of filtering devices angularly disposed about a central vertical axis for rotating around said axis, each of said filtering devices having a horizontal filtering surface substantially in the shape of a circular sector portion, at least one of said filtering devices comprising:
   a filter cloth,
   a supporting structure for supporting said filter cloth tiltable around a horizontal tilting axis integral with said supporting structure, said supporting structure comprising a horizontal cloth support part having a horizontal superior surface, said supporting structure comprising a groove of uniform cross section, entirely located below said horizontal superior surface and extending along a peripheral region of said horizontal cloth supporting part, and
   fastening means for fastening said filter cloth to said supporting structure said fastening means comprising a hollow tubular member made of elastic or substantially elastic material, arranged to cooperate with said groove, said hollow tubular member being designed to distort transversely between a first state, wherein said tubular member can be introduced into, or extracted from the groove into which the filter cloth has been priorly introduced and a second state, wherein said tubular member locks the cloth inside said groove by pressure.

2. A filtering device according to claim 1 wherein the section of the groove is of dovetail shape.

3. A filtering device according to claim 1, wherein the base of the groove is concave.

4. A filtering device according to claim 1, wherein the first state is a free state and the second state is a dilated state.

5. A filtering device according to claim 4, wherein the tubular member has an oval or circular cross section in the free state.

6. A filtering device according to claim 1, wherein the first state is a contracted state and the second state is a distorted state.

7. A circular horizontal filtering apparatus; said apparatus comprising a plurality of filtering devices angularly disposed about a central vertical axis for rotating around said axis, each of said filtering devices having a horizontal filtering surface substantially in the shape of the circular section portion, at least one of said filtering devices comprising:
   a filter cloth,
   a supporting structure for supporting said filter cloth tiltable around a horizontal tilting axis integral with said supporting structure, said supporting structure comprising a horizontal cloth supporting part having a horizontal superior surface, said supporting structure comprising a groove of uniform cross section, entirely located below the horizontal superior surface and extending along a peripheral region of said horizontal cloth supporting part, and
   fastening means for fastening said filter cloth to said supporting structure, said fastening means comprising a hollow tubular member made of elastic material, arranged to cooperate with said groove, said hollow tubular member being constructed arranged to selectively distort between a first state and a second state; said first state being such that said hollow tubular member can be introduced into or extracted from the groove within which the filter cloth has been priorly introduced, said second state being such that said hollow tubular member locks the cloth inside said groove by pressure; said tubular member further being constructed and arranged to selectively distort from said first state to said second state when said tubular member is injected with fluid under pressure.

8. A filtering device according to claim 7, wherein said second state is a dilated state.

9. A filtering device according to claim 7, wherein said second state is a distorted state.

10. A filtering device according to claim 7 further comprising removable means for injecting the tubular member with fluid under pressure.

11. A filtering device according to claim 7, wherein said tubular member further being constructed and arranged such that it selectively distorts from said first state to said second state when said tubular member is injected with water at a relative pressure within the range of about 1 bar to 5 bars.

12. A filtering device according to claim 7, wherein said fastening means further comprises a filling and pressurizing valve, the groove having an enlarged portion arranged for receiving said valve below the level of the superior surface of the horizontal cloth supporting part.

* * * * *

UNITED STATES PATENT AND TRADEMARK OFFICE
CERTIFICATE OF CORRECTION

PATENT NO. : 5,124,037
DATED : June 23, 1992
INVENTOR(S) : Michel Barloy

It is certified that error appears in the above-identified patent and that said Letters Patent is hereby corrected as shown below:

Column 1, line 34 insert --.-- after the word "disadvantages".

Column 3, line 40 "5" should read --35--.

Signed and Sealed this

Twenty-third Day of November, 1993

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO. : 5,124,037
DATED : June 23, 1992
INVENTOR(S) : Michel Barloy

It is certified that error appears in the above-indentified patent and that said Letters Patent is hereby corrected as shown below:

Column 4, line 3, "noeprene" should read --neoprene--.

Column 4, line 8, insert --the-- after the word "between".

Column 4, line 63, "Fig. 1" should read --Fig. 3--.

Signed and Sealed this

Fourteenth Day of December, 1993

Attest:

BRUCE LEHMAN

Attesting Officer     Commissioner of Patents and Trademarks